US009399987B2

(12) United States Patent
Bolz

(10) Patent No.: US 9,399,987 B2
(45) Date of Patent: Jul. 26, 2016

(54) METHOD FOR PERFORMING OPEN-LOOP/CLOSED-LOOP CONTROL OF THE BOOSTING OF A BRAKING FORCE OF A BRAKE SYSTEM, BRAKE BOOSTER, AND CONTROL UNIT

(75) Inventor: Martin-Peter Bolz, Buehl (DE)

(73) Assignee: Robert Bosch GmbH, Stuttgart (DE)

(*) Notice: Subject to any disclaimer, the term of this patent is extended or adjusted under 35 U.S.C. 154(b) by 897 days.

(21) Appl. No.: 13/638,933

(22) PCT Filed: Mar. 29, 2011

(86) PCT No.: PCT/EP2011/054765
§ 371 (c)(1),
(2), (4) Date: Dec. 10, 2012

(87) PCT Pub. No.: WO2011/120941
PCT Pub. Date: Oct. 6, 2011

(65) Prior Publication Data
US 2013/0086901 A1 Apr. 11, 2013

(30) Foreign Application Priority Data
Apr. 1, 2010 (DE) .................. 10 2010 003 602

(51) Int. Cl.
*B60T 8/46* (2006.01)
*F04B 23/00* (2006.01)
*B60T 8/32* (2006.01)
*B60T 8/44* (2006.01)
*B60T 8/48* (2006.01)
*B60T 13/74* (2006.01)

(52) U.S. Cl.
CPC .............. *F04B 23/00* (2013.01); *B60T 8/321* (2013.01); *B60T 8/441* (2013.01); *B60T 8/4872* (2013.01); *B60T 13/745* (2013.01); *B60T 8/46* (2013.01); *B60T 2201/12* (2013.01)

(58) Field of Classification Search
CPC ................. B60T 8/46; B60T 2201/12
See application file for complete search history.

(56) References Cited

U.S. PATENT DOCUMENTS 6,270,171 B1* 8/2001 Krieg .................. B60T 7/12
303/113.3
2006/0087173 A1* 4/2006 Kajiyama ............ B60T 8/3655
303/3

FOREIGN PATENT DOCUMENTS

| DE | 19723394 | 12/1997 |
| DE | 102007016863 | 10/2008 |
| FR | 2826622 | 1/2003 |
| WO | 96/19370 | 6/1996 |
| WO | 2011/032758 | 3/2011 |

OTHER PUBLICATIONS

International Search Report for Application No. PCT/EP2011/054765 dated Aug. 19, 2011 (English Translation and Original, 10 pages).

* cited by examiner

*Primary Examiner* — F. Daniel Lopez
(74) *Attorney, Agent, or Firm* — Michael Best & Friedrich LLP

(57) ABSTRACT

The invention relates to a method for controlling/regulating the boosting of a brake force of a brake system (1), in particular of a power-assisted brake system (1) of a motor vehicle, wherein the brake system (1) comprises a brake force booster (100) having an actuator (130) by means of which a variable additional force ($F_{100}$) can be imparted to a master brake cylinder (200) of the brake system (1), wherein if a relatively high additional force ($F_{100}$) is demanded, a partial volume of a brake fluid is discharged from a brake circuit (300) of the brake system (1) in such a way that the actuator (130) of the brake force booster (100) can be placed relatively quickly into a position in which it can impart a greater additional force ($F_{100}$) to the master brake cylinder (200). The invention also relates to a brake force booster for boosting a brake force of a brake system (1), in particular of a power-assisted brake system (1) of a motor vehicle, having a gearing (120) which can be driven by an electric motor (110), wherein the gearing (120) has an actuator (130) by means of which a piston (210) of a master brake cylinder (200) can be actuated, and wherein the gearing (120) is a cam mechanism (120), in particular an asymmetrical cam mechanism (120), having a control surface (125) or a control groove.

14 Claims, 3 Drawing Sheets

METHOD FOR PERFORMING OPEN-LOOP/CLOSED-LOOP CONTROL OF THE BOOSTING OF A BRAKING FORCE OF A BRAKE SYSTEM, BRAKE BOOSTER, AND CONTROL UNIT

BACKGROUND OF THE INVENTION

The invention relates to a method for performing open-loop/closed-loop control of the boosting of a braking force of a brake system, in particular of a power-assistance brake system of a motor vehicle. In addition, the invention relates to a brake booster for boosting a braking force of a brake system, in particular of a power-assisted brake system of a motor vehicle. Furthermore, the invention relates to a control unit, in particular an ABS or ESP control unit or a control unit of a brake booster by means of which a method according to the invention can be carried out, and/or a brake booster according to the invention can be open-loop/closed-loop controlled.

Activation of a brake system, for example that of a motor vehicle, is usually facilitated by means of a brake booster which increases a braking force applied by a driver of the motor vehicle by a specific amount or a specific factor, that is to say applies an additional force. A resulting total force or braking force is conveyed to the brakes of the motor vehicle, which subsequently brake one wheel or a plurality of wheels of the motor vehicle. A widespread type of brake booster operates on the basis of a partial vacuum accumulator which is evacuated by a suction port of an internal combustion engine of the motor vehicle, with the result that the partial vacuum accumulator makes available energy for boosting the braking force. Not every motor vehicle has an internal combustion engine which can be used to evacuate the pressure accumulator. For example, this is used in diesel vehicles or electric vehicles by way of example instead of using an electrically operated partial vacuum pump. However, partial vacuum accumulators and brake boosters which are based thereon are bulky and the arrangement of the brake booster with respect to the brake system therefore has little flexibility.

DE 10 2007 016 863 A1 discloses an electromechanical brake booster for a motor vehicle, having a rotationally symmetrical cam mechanism roller which is driven by an electric motor. The cam mechanism roller has a pitch groove by means of which a pickup can be moved linearly to and fro on a longitudinal end of a lever during operation of the electric motor. At a longitudinal end of the lever opposite the latter, said lever is connected to a piston of a master brake cylinder and can thereby transmit a force, resulting from the electric motor to the piston. In a center region, the lever is mounted in an articulated fashion, wherein a length ratio of the pickup to the center joint and of the center joint to the mechanical connection to the piston sets a lever ratio of the brake booster. In the case of a method for operating the brake booster, the lever, the cam mechanism roller and therefore the pitch groove and a shaft of the electric motor always have the same position with respect to a specific position of the piston, with the result that an available transmission ratio cannot always be used in an optimum way.

SUMMARY OF THE INVENTION

An object of the invention is to specify an improved method for operating, that is to say for performing open-loop or closed-loop control of, a brake booster, and to specify an improved brake booster. In addition, a control unit is to be specified for this purpose. In this context the intention is, in particular, that it should be possible to apply, at substantially any time, a maximum additional force, resulting from the brake booster, to a piston of a master brake cylinder, wherein the dynamics of the brake system are to be preferably retained. In addition, the brake booster is to be as maintenance-friendly as possible, is to take up little space and is to be capable of being installed in a flexible way.

The object of the invention is achieved by means of a method for performing open-loop/closed-loop control of the boosting of a braking force of a brake system, in particular of a power-assisted brake system of a motor vehicle; a brake booster for boosting a braking force of a brake system, in particular of a power-assisted brake system of a motor vehicle, and a control unit, in particular an ABS or ESP control unit or a control unit of a brake booster.

The brake booster according to the invention has a transmission which can be driven by a drive, in particular an electric motor, wherein the transmission has an actuator or a lever by means of which a piston of a master brake cylinder can be activated. In this context, the transmission is a cam mechanism, in particular a nonuniform cam mechanism which has a control face or a control groove. That is to say, the brake booster is preferably embodied as an electromechanical brake booster. In embodiments of the invention, the transmission can have a cam plate on which a pickup of the actuator can slide or roll, wherein the piston of the master brake cylinder can be activated by means of an activation section of the actuator. In this context, sensing occurs on one side, i.e. the pickup runs on the control face onto which it is preferably pressed by a spring force. Of course, positive guidance, such as for example a control groove in a guide disk, can also be applied according to the invention.

In particular the drive, in particular the electromotor, of the brake booster, can be made smaller and therefore more cost-effective by means of a nonuniform transmission, it being possible to dispense with a comparatively large vacuum brake booster. This reduction in size can be of such an extent that the drive only just reaches the required maximum force only after, for example, approximately 25% up to approximately 33% of the travel of the piston of the master brake cylinder, and that said drive can constitute required braking dynamics on only the first approximately 30% of this travel. The resulting drive with a transmission is highly reduced and the electromechanical configuration of the brake booster is simple and maintenance-friendly, and therefore provides an advantage in terms of installation space and costs.

The brake booster according to the invention can be operated here, i.e. open-loop or closed-loop controlled, with a method according to the invention. In this context, the brake booster is configured in such a way that said brake booster itself, or that, by means of the brake booster, such a method is implementable and can be correspondingly implemented. That is to say, a control unit which actuates or adjusts a brake booster or the brake booster according to the invention is either part of the brake booster, in particular the electric motor therefor, or the brake booster can be actuated or adjusted externally. This then preferably occurs by means of an ABS or ESP control unit. That is to say also that the method according to the invention can be carried out by these known control units or by other control units in any suitable brake booster, and can be correspondingly carried out.

In the method according to the invention, when a comparatively large additional force is requested by a brake booster, a comparatively small partial volume of a brake fluid is discharged or removed from a brake circuit of a brake system in such a way that an actuator of the brake booster can be moved comparatively quickly into a position in which it can impart a relatively large additional force onto the master brake cylinder. The discharging or removal of the partial volume of the brake fluid from the brake circuit preferably takes place in such a way that a pressure of the brake fluid in the brake circuit initially remains constant on average and subsequently preferably rises. In this context, the actuator is adjusted in accordance with a piston of the master brake cylinder, wherein the adjustment occurs, in particular, with power assistance by means of the electric motor. Any instant pressure drop and re-increase in the brake circuit owing to opening of a valve in order to discharge or remove the partial volume of the brake fluid is not intended to be taken into account here.

By means of the method according to the invention, it is possible, given a sudden request for a large braking force, in particular for a required, substantially maximum brake boosting, to make available said boosting in an electromechanical brake booster. That is to say, the cam plate or the guide disk of the nonuniform transmission, and as a result thereof a position of the actuator and of the piston of the master brake cylinder, does not firstly have to be implemented under considerable application of force but instead can, according to the invention, be established substantially more quickly; by virtue of the fact that a braking point of the piston of the master brake cylinder is moved into a position in which the brake booster can apply its entire boosting, which can preferably occur even without a loss of pressure and, if appropriate, even with a rise in pressure in the brake circuit. That is to say, it is possible to apply a maximum additional force to the piston of the master brake cylinder substantially at any time, wherein dynamics of the brake system are retained.

The discharging or removal of the partial volume of the brake fluid from the brake circuit preferably takes place by means of an open-loop/closed-loop controllable valve which discharges the partial volume into an equalizing circuit or a low-pressure accumulator. The discharging or removing of the partial vacuum preferably occurs by means of an ABS or an ESP system of the motor vehicle, wherein the ABS or the ESP system preferably discharges the partial vacuum to a rear wheel. The discharging of brake fluid at a rear axle has a tangentially stabilizing effect here, which is therefore advantageous. According to the invention, a control unit of the brake booster or for the brake booster can output an electrical control signal for discharging the partial volume of the brake fluid. In this context, the control unit preferably outputs the control signal to the ABS or the ESP system, which consequently reacts correspondingly. If large to extremely large brake boosting forces are requested, use of the ABS system is very probable, providing the possibility of influencing brake pedal travel up to the regions which give rise to an increase in the boosting conditions.

BRIEF DESCRIPTION OF THE DRAWINGS

The invention will be described in more detail below by means of exemplary embodiments and with reference to the appended, schematic drawing, in which.

DETAILED DESCRIPTION

Figure 1:
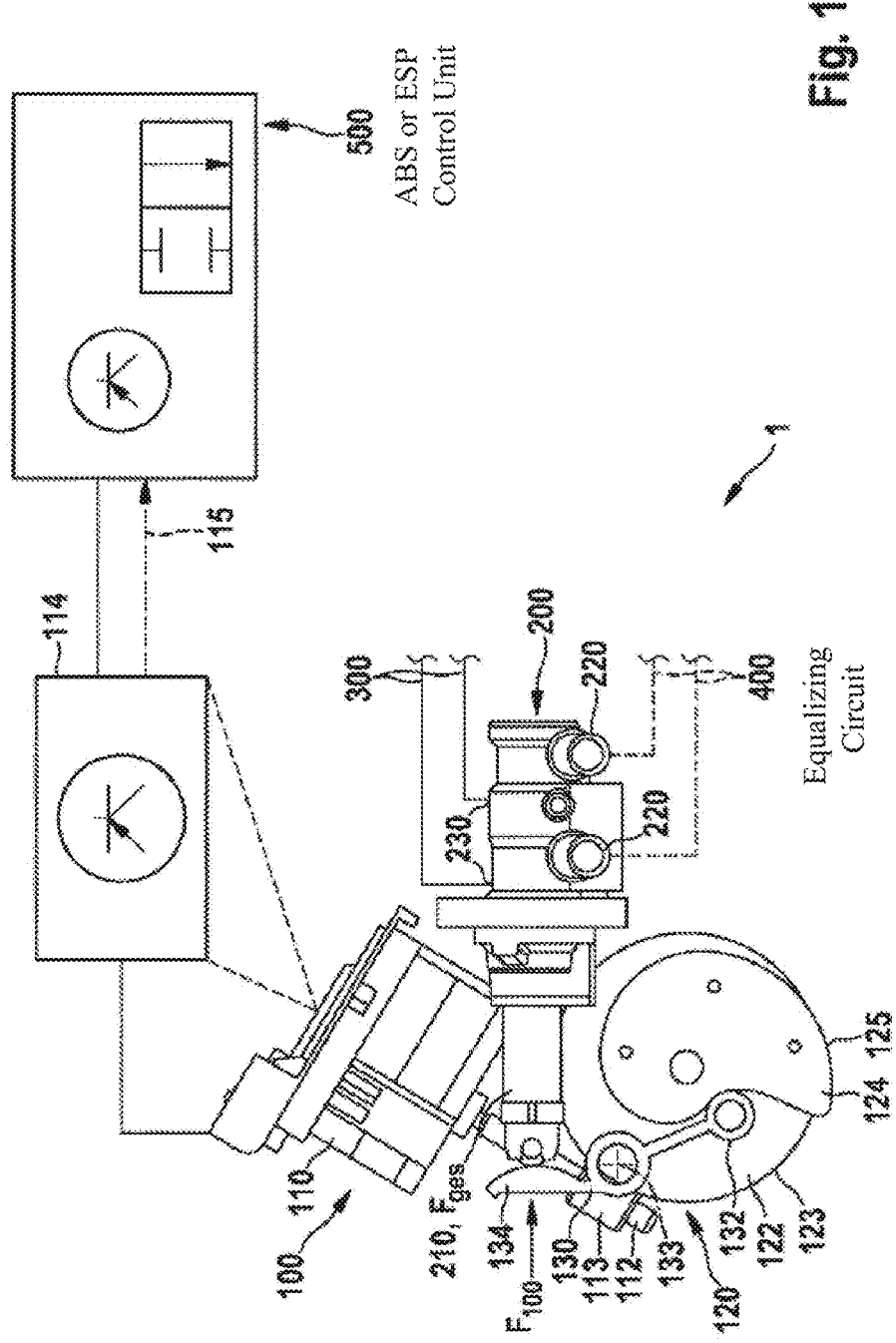
FIG. 1 is a basic illustration of a brake booster according to the invention on a brake system, by means of which a method according to the invention is explained.

FIG. 1 shows a detail of a brake system 1, preferably of a vehicle brake system 1, in particular of a power-assisted brake system 1, where just one brake booster 100, one master brake cylinder 200, a brake circuit 300 or brake fluid circuit 300 and an equalizing circuit 400 which lead through the master brake cylinder 200, and a control unit 500, in particular an ABS or ESP control unit 500, are illustrated. The control unit 500 performs open-loop or closed-loop control of the brake booster 100 or the drive 110 thereof, preferably in cooperation with a control unit 114, which is, in particular, a component of the brake booster 100, said drive 110 being preferably embodied as an electric motor 110. Two brake circuits 300 (connections 230 on the master brake cylinder 200), which are separate from one another, can preferably be supplied by means of the master brake cylinder 200, with the result that each brake circuit 300 can activate at least one brake (not illustrated). The equalizing circuit 400 (connections 220 on the master brake cylinder 200) in which an equalizing container and/or a low-pressure accumulator (both not illustrated), preferably of an ABS or ESP assembly, are/is provided, takes up excess brake fluid or leakages in the brake circuit 300.

Depending on an operating state, the brake booster 100 can activate a piston 210 of the master brake cylinder 200, as a result of which in addition to a pedal force, preferably resulting from a brake pedal (not illustrated), an additional force $F_{100}$, resulting from the brake booster 100, can be applied to the piston 210. That is to say, a resulting total force $F_{total}$ acting on the piston 210 or a braking force $F_{total}$ results from the addition of the additional force $F_{100}$ to the pedal force. In this context, the piston 210 travels through a specific adjustment travel x; see in this respect also FIG. 2. The brake booster 100 itself is preferably embodied as an electromechanical brake booster 100 whose drive unit is composed of the drive 110 and a transmission 120. The brake booster 100 must be capable of meeting both a request for dynamics and a request to reach a maximum additional force $F_{100}$. By means of a nonuniform transmission 120 it is possible to ensure that at a start of the adjustment travel x (position in FIG. 1) the rotations of the drive 110 are converted into more adjustment travel, and after the start or at an end they are converted into more additional force $F_{100}$. As a result, at the start more dynamics are available, as are usually required, and later, that is to say, for example, from a third or from half of the adjustment travel x onwards, the maximum additional $F_{100}$ is available.

In one embodiment according to the invention, the transmission 120 is embodied as a cam mechanism 120 with a variable transmission ratio. That is to say, for example, the transmission 120 has a drive disk 122 with preferably an outer toothing 123, preferably a worm gear 122, which can be driven by an outer toothing 113 of a motor shaft 112, for example a worm 113, of the drive 110 which is preferably embodied as an electric motor 110. It is, of course, possible to apply a different configuration in order to cause the transmission 120 to move rotationally in a uniform or else nonuniform fashion. Adjacent to the drive disk 122, and connected thereto in a rotationally fixed fashion, there is a cam plate 124 or a guide plate (not illustrated in the drawing), which activates an actuator 130 of the transmission 120, which in turn activates the piston 210 of the master brake cylinder 200. In this context, the actuator 130 can be embodied, for example, as a lever 130 which is spring-biased in the direction of the cam plate 124. Biasing is not necessary in the case of a cam plate, since in such a case the actuator 130 is positively guided in a control groove and does not slide or roll on a control face 125 as in the case of a cam plate 124.

During operation of the electric motor 110 by means of a pickup 132 which is embodied or provided thereon, the actuator 130 senses the control face 125 or the control groove. Lying opposite with respect to a center of gravity 133 of the actuator 130, the latter has an activation section 134 by means of which the actuator 130 activates the piston 210. In this context, the actuator 130 is mounted in a rotatable or pivotable fashion at the center of gravity 133, and the pickup 132 and the activation section 134 are preferably provided or embodied on longitudinal end sections of the actuator 130 lying opposite one another. The corresponding dimensions are selected here in such a way that in its maximum movement path the activation section 134 mainly carries out a translational movement, or a contact geometry or joint geometry between the actuator 130 and the piston 210 is selected such that a translational transmission of movement from the activation section 134 of the actuator 130 to the piston 210 is possible. In the present case, a longitudinal end of the piston 210 is of convex design here or is provided with a rotatable roller on which the activation section 134 bears with a radial face.

Figure 2:
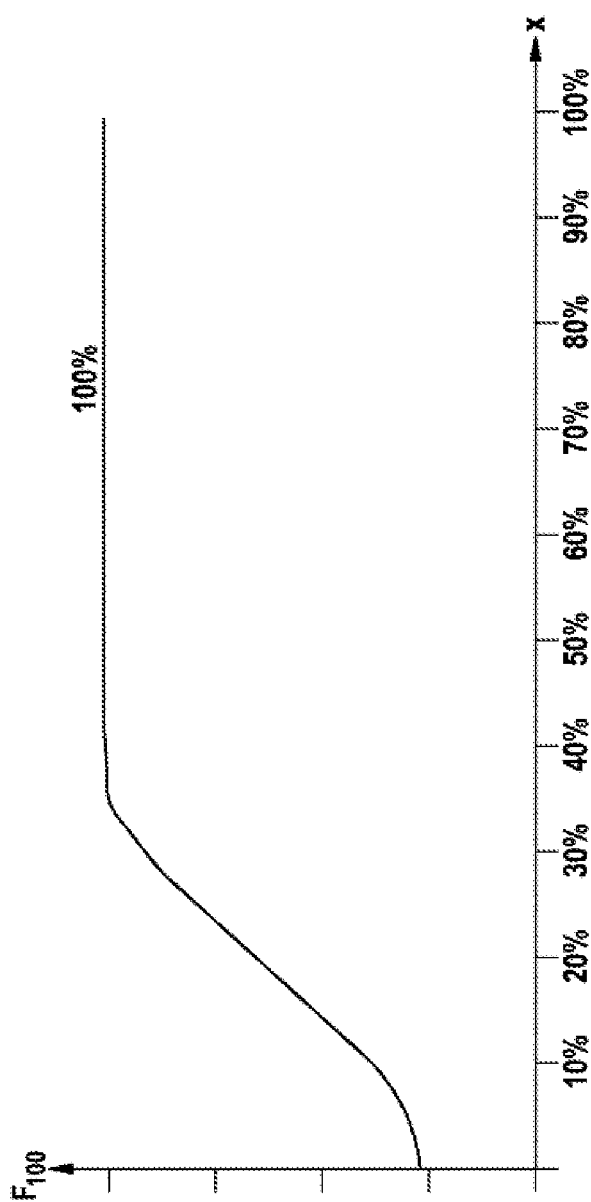
FIG. 2 is a force/travel diagram of the brake booster from FIG. 1, which represents an additional force which can be reached by the brake booster, plotted against a travel of a piston of a master brake cylinder.
Figure 3:
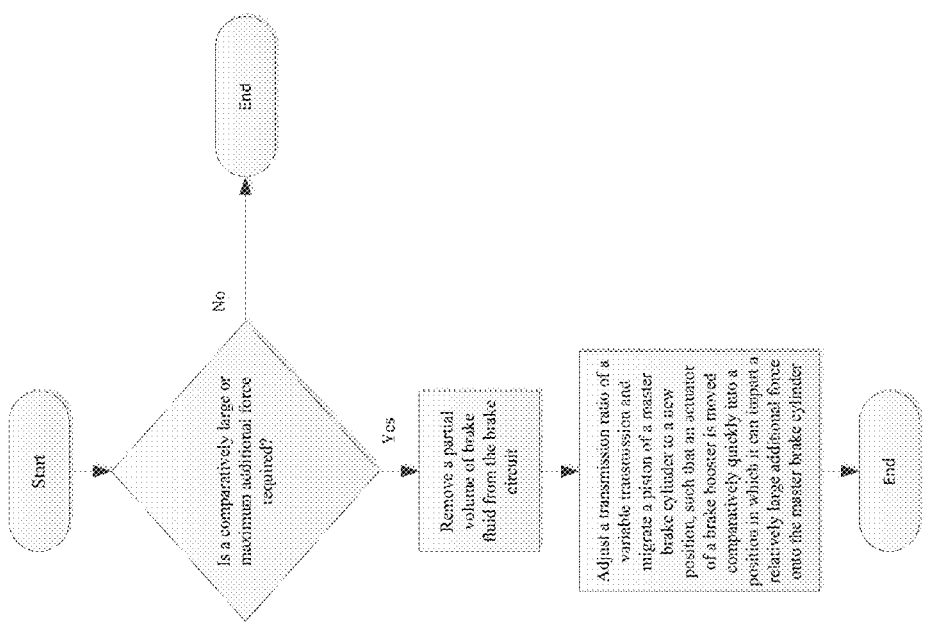
FIG. 3 is a flow chart illustrating the steps of a method for performing open/closed-loop control of the boosting of a braking force of a brake system.

The brake booster 100 with the cam plate 124 or the guide plate is configured here in such a way that a transmission ratio over an adjustment travel x is nonuniform, as illustrated by way of example in FIG. 1 and clarified in more detail in FIG. 2. That is to say, from a zero position of the piston 210 of the master brake cylinder 200 or of the cam plate 124 or of the guide disk, which zero position is illustrated in FIG. 1, the guide face 125 or guide groove is configured in such a way that the additional force $F_{100}$ acting on the piston 210 initially increases as a function of the adjustment travel x of the piston 210, preferably increases substantially linearly, before then remaining at a specific maximum additional force $F_{100}$ (see FIG. 2). That is to say, starting from the zero position, a radius to the guide disk 124 whose outer edge forms the guide face 125 initially increases strongly, preferably with an exponent, before then growing only linearly. This can be implemented with any desired curved shape of the control face 125. For example sections of parabolas, evolvents and/or evolutes are suitable for this. The behavior is similar with the guide groove of the guide plate.

According to the invention, starting from the zero position, that is to say at the start of the adjustment travel x of the piston 210 of the master brake cylinder 200, the brake booster 100 does not have the potential to apply the full boosting force $F_{100}$ to the master brake cylinder 200. This is generally not a problem either since the brake system 1 in its entirety constitutes a spring which only builds up a full opposing force over the adjustment travel x. However, it may be the case that the brake system 1 already has a high counterpressure rather early, that is to say at low adjustment travel values x of the piston 210, for example when a driver assistance system such as, for example, ACC (Adaptive Cruise Control) has already built up pressure in the brake circuit 300. In this case, the controller 114 or 500 of the brake booster 100 can state that after a short adjustment travel x, for example 20%, the drive 110 already applies a large part of its maximum torque, for example 90%. This can then be conveyed by the brake booster 100 to, for example, a suitable system, for example an ABS or an ESP system of the motor vehicle, by means of a suitable signal duct 115. The ABS or ESP system can then, according to the invention, increase the adjustment travel x of the piston 210 by discharging a small partial volume of the brake fluid, preferably from the rear wheel brake cylinders, which leads to relatively high stress forces of the brake booster 100.

That is to say if a comparatively large or maximum additional force $F_{100}$ is already required at the start of the adjustment travel x of the piston 210 of the master brake cylinder 200 and if the brake booster 100 must make this force available, according to the invention, a partial volume of the brake fluid is removed from the brake circuit 300 and preferably discharges into the equalizing circuit 400. This can take place at any desired location on the brake circuit 300, as long as a corresponding device or apparatus, for example a valve, in particular an open-loop/closed-loop controllable valve, is present; in particular the ABS or ESP system is suitable for this. If the control unit 114 or 500 or some other controller therefore detects that more braking force is required than can be reached at a position of the actuator 130, said control unit 114 transmits a corresponding signal 115 to a corresponding device such as, for example, to the ABS or ESP system. This signal 115 then causes the device or the ABS or ESP system to discharge some brake fluid from the brake circuit 300. As a result, the piston 210 migrates into a position, a new "braking point" at which the drive unit can generate, with its nonuniform transmission 120, a relatively large force in the brake circuit 300.

In the case of a currently conventional embodiment of the ABS or ESP, a volume reduction occurs in the brake circuits there usually in a low-pressure accumulator or the low-pressure accumulators of the ABS or ESP system or assembly. According to the invention, ABS and ESP systems discharge an excess partial volume of the brake fluid into the low-pressure accumulator or a low-pressure accumulator within the ABS or ESP assembly by using the discharge valves there. In an application case of the ABS or ESP, the partial volume of the brake fluid is then fed back again behind a brake pedal into the master brake cylinder 200 by means of a feedback pump, driven by a motor, in order to prevent the brake pedal from dropping. Consequently, the motor cannot be actuated again either, so that the transmission 120 of the non-linear electrical brake booster 100 drops further, in order to allow the additional force $F_{100}$ to rise. The low-pressure accumulator or accumulators of the ABS or ESP assembly must, if appropriate, be adapted in terms of a volume in order to ensure that the necessary partial volume of the brake fluid is taken up.

It is preferred that the pressure of the brake fluid in the brake circuit 300 does not drop but instead remains at least the same, in particular rises; apart from a possible pressure drop peak when the valve is opened in order to discharge the partial volume of the brake fluid. This is achieved in that the drive 110 is correspondingly actuated, as a result of which the actuator element 130 moves the piston 210 of the master brake cylinder 200 under an at least constant pressure in the brake circuit 300 in the case of an open valve (see above) in the brake circuit 300. As a result, only the "working window" of the piston 210 is shifted, albeit into a position in which the brake booster 100 can make available its maximum additional force $F_{100}$. In this context, the actuator 130 is preferably firstly moved into a position in which the brake booster 100 can for the first time make available approximately 100% of the additional force $F_{100}$. This is the case in FIG. 2 at approximately 33% of the adjustment travel x of the piston 210.

In this context, the brake booster 100 is configured or actuated in such a way that the method is not started until a torque or an electric current of the drive 110, in particular of the electric motor 110, reaches approximately 70% to approximately 95%, preferably approximately 75% to approximately 90% and, in particular, approximately 80% to approximately 85% of a torque or electric current which is possible at the respective operating point. When this torque or this electric current is reached, the corresponding electrical control signal 115 is preferably output by the control unit 114 of the brake booster 100, in particular to the ABS or ESP control unit 500. However, this can also take place by means of another control unit, wherein an ECU (Engine Control Unit) can also perform this task. In addition, in particular the transmission 120, embodied as a cam mechanism 120, of the brake booster 100 is configured in such a way that, from the zero position of the piston 210 of the master brake cylinder 200, the maximum additional force $F_{100}$ is not reached until after approximately 20% to 25%, preferably only after approximately 25% to 30%, in particular only after approximately 30% to 35% (see FIG. 2), particularly preferably only after approximately 35% to 40% and, in particular, particularly preferably only after approximately 40% to approximately 45% of an adjustment travel x of the piston 210.

The invention claimed is:

1. A method for performing control of boosting of a braking force of a brake system (1), wherein
the brake system (1) comprises a brake booster (100) having a variable transmission (120) with an actuator (130) by which a variable additional force ($F_{100}$) can be imparted to a piston (210) of a master brake cylinder (200) of the brake system (1),
characterized in that,
when a comparatively large additional force ($F_{100}$) is requested, a partial volume of a brake fluid is discharged from a brake circuit (300) of the brake system (1) so that a transmission ratio of the variable transmission (120) is adjusted and so that the piston (210) of the master brake cylinder (200) migrates into a new position, in such a way that the actuator (130) of the brake booster (100) is moved comparatively quickly into a first operating position in which it can impart a relatively large additional force ($F_{100}$) onto the master brake cylinder (200).

2. The method as claimed in claim 1, characterized in that the discharging of the partial volume of the brake fluid from the brake circuit (300) takes place in such a way that a pressure of the brake fluid in the brake circuit (300) initially remains at least constant, wherein the actuator (130) is adjusted with the piston (210) of the master brake cylinder (200).

3. The method as claimed in claim 1, characterized in that the discharging of the partial volume of the brake fluid from the brake circuit (300) occurs by means of a controllable valve which discharges the partial volume into an equalizing circuit (400) or a low-pressure accumulator within an ABS or ESP system of the brake system (1).

4. The method as claimed in claim 1, characterized in that a control unit (114) of the brake booster (100) outputs an electrical control signal (115) for discharging the partial volume of the brake fluid.

5. The method as claimed in claim 1,
wherein a torque or an electric current of the brake booster reaches approximately 70% of a maximum torque or maximum electric current at the first operating point.

6. The method as claimed in claim 1,
wherein a maximum additional force ($F_{100}$) of the actuator is not reached until after approximately 15% to approximately 50% of a maximum total adjustment travel (x) of the piston (210).

7. The method as claimed in claim 1, characterized in that the discharging of the partial volume of the brake fluid from the brake circuit (300) takes place in such a way that a pressure of the brake fluid in the brake circuit (300) initially remains at least constant due to adjustment of the piston (210), and subsequently rises.

8. The method as claimed in claim 1, characterized in that a control unit (114) of the brake booster (100) outputs an electrical control signal (115) for discharging the partial volume of the brake fluid, wherein the control unit (114) outputs the control signal (115) to an ABS or ESP system, which consequently reacts correspondingly.

9. The method as claimed in claim 1, wherein a torque or an electric current of the brake booster reaches approximately 80% of a maximum torque or maximum electric current at the first operating point, and wherein, when this torque or this electric current is reached, an electrical control signal (115) is output by the control unit (114) of the brake booster (100).

10. The method as claimed in claim 1, wherein a torque or an electric current of the brake booster reaches approximately 90% of a maximum torque or maximum electric current at the first operating point, and wherein, when this torque or this electric current is reached, an electrical control signal (115) is output by the control unit (114) of the brake booster (100).

11. The method as claimed in claim 1, wherein a torque or an electric current of the brake booster reaches approximately 95% of a maximum torque or maximum electric current at the first operating point, and wherein, when this torque or this electric current is reached, an electrical control signal (115) is output by the control unit (114) of the brake booster (100).

12. The method as claimed in claim 1, characterized in that the transmission (120) includes a cam mechanism (120) that is configured in such a way that, a maximum additional force ($F_{100}$) of the actuator is not reached until after approximately 20% to approximately 40% of a maximum total adjustment travel (x) of the piston (210).

13. The method as claimed in claim 1, characterized in that the transmission (120) includes a cam mechanism (120) that is configured in such a way that, a maximum additional force ($F_{100}$) of the actuator is not reached until after approximately 25% to approximately 33% of a maximum total adjustment travel (x) of the piston (210).

14. A method for performing control of boosting of a braking force of a brake system (1), wherein
the brake system (1) comprises a brake booster (100) having a variable transmission (120) with an actuator (130) by which a variable additional force ($F_{100}$) can be imparted to a piston (210) of a master brake cylinder (200) of the brake system (1),
characterized in that,
when a comparatively large additional force ($F_{100}$) is requested a partial volume of a brake fluid is discharged from a brake circuit (300) of the brake system (1) so that a transmission ratio of the variable transmission (120) is adjusted and so that the piston (210) of the master brake cylinder (200) migrates into a new position, in such a way that the actuator (130) of the brake booster (100) is moved comparatively quickly into a first operating position in which it can impart a relatively large additional force ($F_{100}$) onto the master brake cylinder (200), and
in that the discharging of the partial volume of the brake fluid from the brake circuit (300) occurs by means of a controllable valve which discharges the partial volume into an equalizing circuit (400) or a low-pressure accumulator within an ABS or ESP system of the brake system (1), wherein the discharging of the partial volume takes place by means of an ABS or an ESP system of the motor vehicle, and the ABS or the ESP system discharges the partial volume at a rear wheel.

\* \* \* \* \*